United States Patent [19]

Pelfrey

[11] Patent Number: 4,591,301

[45] Date of Patent: May 27, 1986

[54] MAGNETIC BASE MACHINE TOOL

[75] Inventor: Keith A. Pelfrey, Hanover, Pa.

[73] Assignee: Black & Decker Inc., Newark, Del.

[21] Appl. No.: 680,763

[22] Filed: Dec. 12, 1984

[51] Int. Cl.[4] .......... B23B 45/14

[52] U.S. Cl. .......... 408/76; 408/135; 408/178; 408/710

[58] Field of Search .......... 408/5, 4, 76, 135, 178, 408/710; 269/231, 235, 8, 17

[56] References Cited

U.S. PATENT DOCUMENTS

| | | | |
|---|---|---|---|
| Re. 24,203 | 8/1956 | Buck . | |
| Re. 26,037 | 6/1966 | Herfurth . | |
| Re. 30,519 | 2/1981 | Hougen . | |
| D. 170,352 | 9/1953 | Buck . | |
| D. 180,640 | 7/1957 | Buck . | |
| 2,357,690 | 9/1944 | Rugheimer . | |
| 2,622,457 | 12/1952 | Buck . | |
| 2,820,377 | 1/1958 | Buck . | |
| 2,876,663 | 3/1959 | Buck . | |
| 2,932,194 | 4/1960 | Buck . | |
| 2,938,411 | 5/1960 | Herfurth . | |
| 2,955,491 | 10/1960 | Buck . | |
| 2,977,825 | 4/1961 | Buck . | |
| 3,044,321 | 7/1962 | Buck . | |
| 3,044,324 | 7/1962 | Buck . | |
| 3,159,061 | 12/1964 | Walker et al. . | |
| 3,254,547 | 6/1966 | Engelsted et al. . | |
| 3,342,089 | 9/1967 | Palm . | |
| 3,371,257 | 2/1968 | Warren et al. .......... | 318/39 |
| 3,728,027 | 4/1973 | Watanabe . | |
| 3,796,506 | 3/1974 | Buck . | |
| 3,969,036 | 7/1976 | Hougen . | |
| 4,261,673 | 4/1981 | Hougen .......... | 408/5 |
| 4,278,371 | 7/1981 | Meyer . | |
| 4,390,309 | 6/1983 | Fangmann .......... | 408/76 |
| 4,456,410 | 6/1984 | Mikiya et al. .......... | 408/76 |

*Primary Examiner*—Donald R. Schran

*Attorney, Agent, or Firm*—R. B. Sherer; H. Weinstein; J. B. Hoofnagle

[57] ABSTRACT

A magnetic base drilling machine includes a base having a magnet coil therein and a motor assembly mounted on the base for driving a rotary cutting tool. Electrical circuitry, including switches for applying power to the magnet coil, for reversing the direction of current to the magnet coil, and for controlling the current to the motor are provided for controlling the magnet coil and motor. A user-manipulatable control handle includes a multi-function control cam having cam surfaces that selectively control the switch that applies power to the magnet coil and which physically blocks operation of the motor switch until the magnet coil is energized. Conversely, the magnet coil cannot be de-energized until the motor switch is moved to its off position. If desired, the direction of the electrical current applied to the magnet coil can be reversed to assist in removing the base from a magnetized work surface. A pointed stabilizer pin is controlled by the control cam to mechanically engage and disengage a work surface as the magnet coil is energized and de-energized.

11 Claims, 16 Drawing Figures

FIG. 5a FIG. 5b FIG. 5c
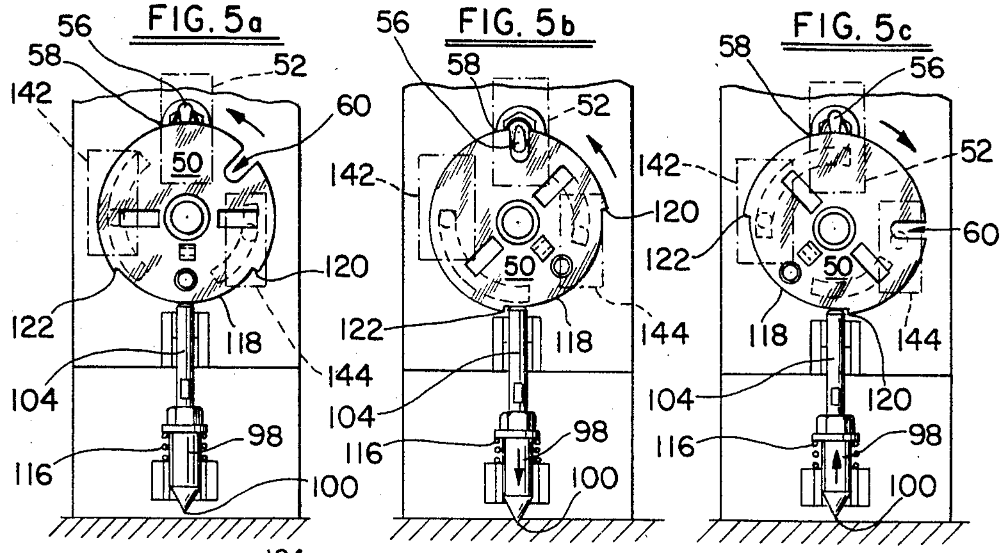
FIG. 6a FIG. 6b FIG. 6c
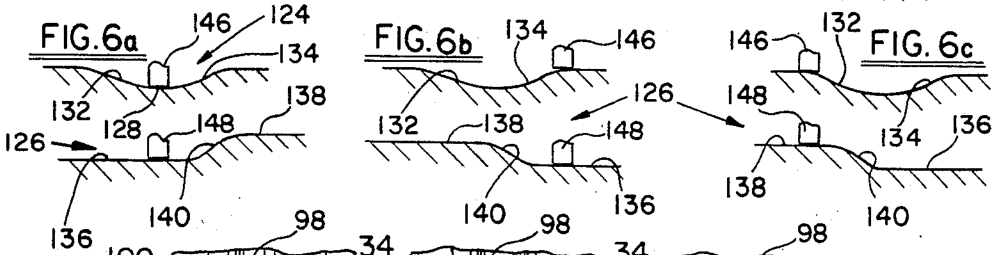
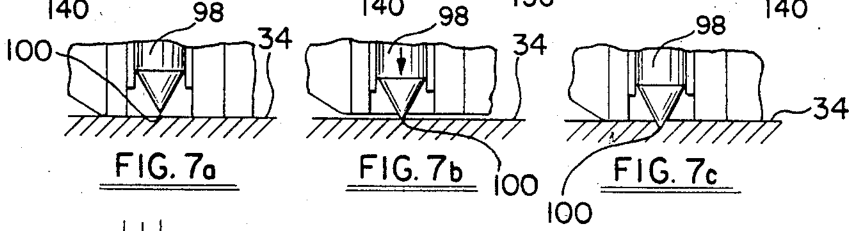
FIG. 7a FIG. 7b FIG. 7c
FIG. 8
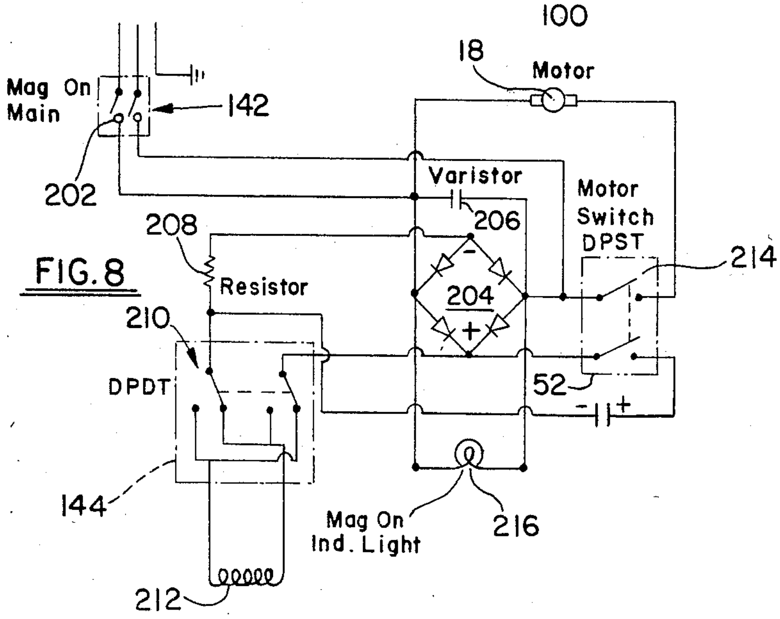

MAGNETIC BASE MACHINE TOOL

BACKGROUND OF THE INVENTION

The present invention relates to machine tools and, more particularly, to machine tools having a motor driven tool for engaging a work piece and an electromagnetic base that can be selectively energized to magnetically engage a work surface.

Magnetic base machine tools typically include a electromagnetic support base that can be energized to engage a work surface and a drive motor assembly mounted on the base. A tool bit, such as a drill bit, is coupled to the drive motor assembly and is used to machine the work surface or a workpiece after the magnetic base has been energized. The magnetic base typically includes a flux producing magnet coil and a flux concentrating core. When an electric current of suitable magnitude is passed through the magnet coil, a magnetic flux is produced to firmly attach the magnetic base to a work surface. Where the machine tool is a drilling machine, the drive motor assembly is typically carried on guides for movement along a tool axis with a rack and pinion assembly allowing a user to control the movement of the drive motor and attached tool bit. As the tool bit engages the work surface, it exerts a reaction torque on the energized magnetic base which can cause the magnetic base to slide on the work surface. The reaction torque can be substantial and can arise quite suddenly, for example, when a tool bit stalls in the work surface. In order to counteract the reaction torque, it is common in these type of machines to provide a pointed stabilizer pin that is driven into the work surface to provide a mechanical engagement between the magnetic base and the work surface, the mechanical engagement typically sufficient to counteract any reaction torque produced by the tool bit while it engages the work surface.

Magnetic base machine tools have found utility in fabricating and repairing large steel structures, such as bridgeworks and ships, where the magnetic base can conveniently secure the machine tool to horizontal, vertical, and even overhead surfaces to allow machining that might otherwise be difficult or impossible to accomplish using hand-held power tools.

There are a number of criteria applicable when designing a magnetic base machine tool, such as a drilling or boring machine. To prevent the support base from sliding on the work surface in response to the reaction torque developed by the tool bit, it is important that the magnet coil in the base be energized and the stabilizer pin be in place to secure the tool to the work surface prior to operation of the tool driving motor. In addition, the magnetic base should be kept energized during run down of the tool motor to prevent breakaway if the magnet coil is de-energized before the tool motor comes to a halt. In those instances where the magnetic base is energized for a considerable period of time, a permanent magnetic set can be induced in the work surface. In this instance, it is desirable to momentarily reverse the magnetic field applied by the magnetic base to facilitate removal of the base from the work surface.

In the past, various controls and switching devices have been provided to effect the various sequential control operations. The use of plural, separately operated controls can be susceptible to mis-operation, particularly by untrained operators. In order to optimize operation, it is desirable that any control unit cause all the functional steps that must be taken to occur in the proper sequence and in such a way that out-of-sequence operation or mis-operation is impossible. It is also preferable, from the standpoint of user convenience, that the control unit be operable with one-hand only to enhance the ease of operation.

SUMMARY OF THE INVENTION

In view of the above, it is a primary object of the present invention, among others, to provide a magnetic base machine tool that is convenient to set-up on a work surface and to operate.

It is another object of the present invention to provide a magnetic base machine tool, such as a magnetic base drilling or boring machine, in which one control can be used to provide multiple control functions.

It is another object of the present invention to provide a magnetic base machine tool in which the various control functions required for operation of the magnetic base and the tool driving motor can be performed in a predetermined sequence and in which no control function can be performed out of sequence.

In accordance with these objects, and others, a magnetic base machine tool in accordance with the present invention includes a support base having a magnet coil that can be selectively energized to magnetically engage a work surface and a drive motor assembly carried on the support base for driving a tool bit, such as a rotary cutting bit. The magnet coil and the drive motor are controlled by electrical circuitry that includes a switch for applying electrical current to the magnet coil, a switch for reversing the flow of current to the magnet coil to reverse the direction of the generated magnetic field, and a switch for supplying current to the drive motor. A user-operable multi-function cam includes cam surfaces for operating the switches that control power to the magnet coil and includes surfaces that block operation of the motor switch. The control cam is operable between cam positions in which the cam surfaces operate the first and second switches to supply power in a first direction to the magnet coil and unblock the motor switch for operation by the user to an ON position and another cam position in which the motor switch is blocked in an OFF position and the power to the magnet coil is either interrupted or reversed to facilitate removal of the machine tool from the work surface. Accordingly, the motor switch cannot be operated to turn the motor ON until after the magnet coil is energized to magnetically engage the work surface, and the magnet coil cannot be de-energized until after the motor has been de-energized. In addition, the multi-function control cam can include a cam surface for operating a pointed stabilizer pin by which the pin is drawn into mechanical engagement with the work surface as the magnet coil is energized to both magnetically and mechanically engage the work surface.

In the preferred form, the machine tool is provided with a user-rotatable handle having having a switch operating control cam at one end. The control cam includes first and second axial-face cam profiles for operating switches that control the power to the machine tool, including the magnet coil, and that control the reversal of the power to the magnet coil to control the direction of the magnetic field. The control cam is provided with a radially outward flange having a peripheral surface that physically blocks operation of the motor switch by the operator until the control cam is rotated to a position in which the magnet coil is energized to magnetically engage the machine tool with the work surface. A peripheral cam surface is provided to engage a stabilizer pin assembly and drive a pointed stabilizer pin into the work surface as the magnet coil is energized. The user-rotatable handle allows a machine operator to effect the various control functions in the proper sequence with one hand and in such a way that mis-operation of the machine is precluded. The handle can be rotated from an initial position, in which operation of the drive motor switch is blocked, to a position in which the magnet coil is energized, the stabilizer pin is drawn into the work surface, and the motor switch is unblocked to allow ON/OFF control of the drive motor. After completion of the desired machining steps, the handle cannot be rotated back to the initial position until the motor switch is in its OFF position. As the handle is rotated back to its initial position, the stabilizer pin is retracted from the work surface and the electrical current applied to the magnet coil is interrupted to permit removal of the magnetic base from the work surface. Where a permanent magnetic set is induced in the work surface, the control handle can be rotated beyond its initial position to reverse the electrical current applied to the magnet coil to reverse the magnetic field generated by the magnet coil to assist in removing the magnetic base from the work surface.

The present invention advantageously provides a magnetic base machine tool in which the various control functions can be carried out in their correct sequence with a minimum of operator effort to provide a machine tool that is convenient to set-up and to use.

Other objects and further scope of applicability of the present invention will become apparent from the detailed description to follow, taken in conjunction with the accompanying drawings, in which like parts are designated by like reference characters.

Figure 2:
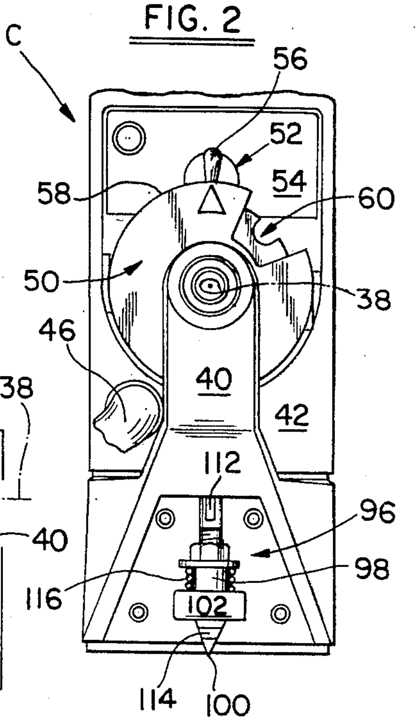
FIG. 2 is an end elevational view, taken along line 2—2 of FIG. 1, illustrating a user-operable controller.
Figure 4:
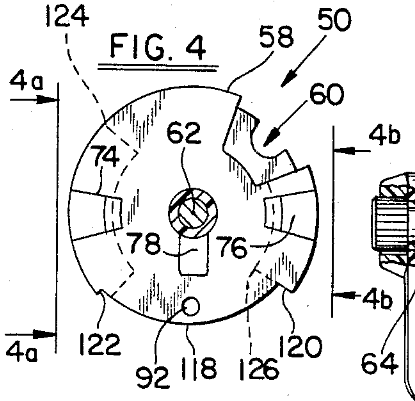
FIG. 4 is an end view of a control cam taken along line 4—4 of FIG. 3 with selected sections omitted for reasons of clarity.
Figure 3:
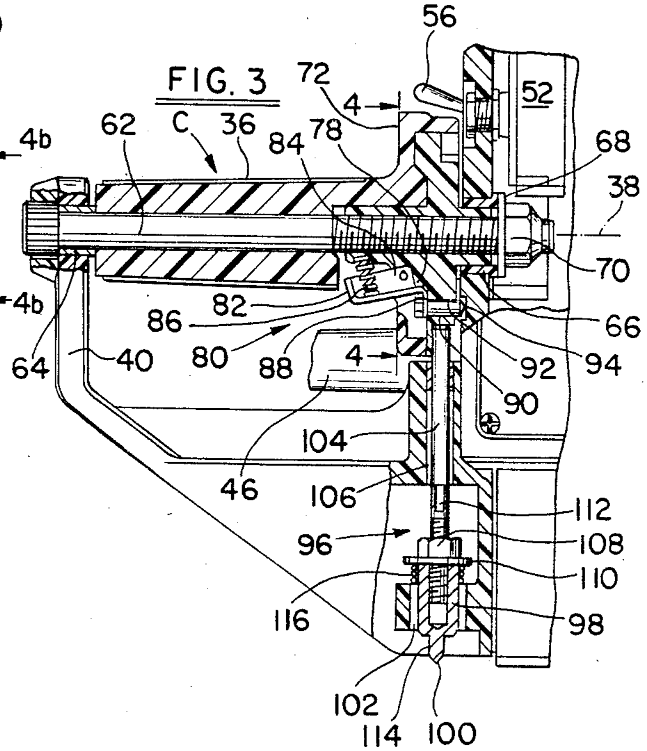
FIG. 3 is a side elevational view, in partial cross section, of the user-operable controller shown in FIG. 2.
Figure 4A:
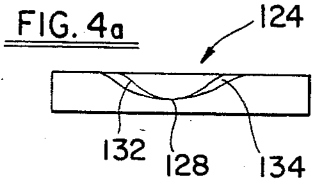
Figure 4B:
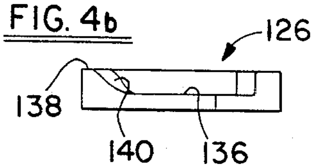

FIG. **4*a* is a side view of the control cam of FIG. 4 taken along line 4*a*—4*a* of FIG. 4** illustrating a cam surface for actuating a switch that controls the application of electrical power to the drilling machine;

FIG. **4*b* is a side view of the control cam of FIG. 4 taken along line 4*b*—4*b* of FIG. 4** illustrating a cam surface for actuating a switch that controls the direction of electrical current through a magnet coil;

FIG. **5*a* is an end elevational view of the controller of FIGS. 2 and 3** in a first operational position;

FIG. **5*b* is an end elevational view of the controller of FIG. 5*a*** in a second operational position;

FIG. **5*c* is an end elevational view of the controller of FIGS. 5*a* and 5*b*** in a third operational position;

FIG. **6*a* is a flat development of the switch actuating cam profiles of FIGS. 4*a* and 4*b* corresponding to the first operational position of FIG. 5*a*;**

FIG. **6*b* is a flat development of the switch actuating cam profiles of FIG. 6*a* corresponding to the second operational position of FIG. 5*b*;**

FIG. **6*c* is a flat development of the switch actuating cam profiles of FIGS. 6*a* and 6*b* corresponding to the third operational position of FIG. 5*c*;**

Figure 1:
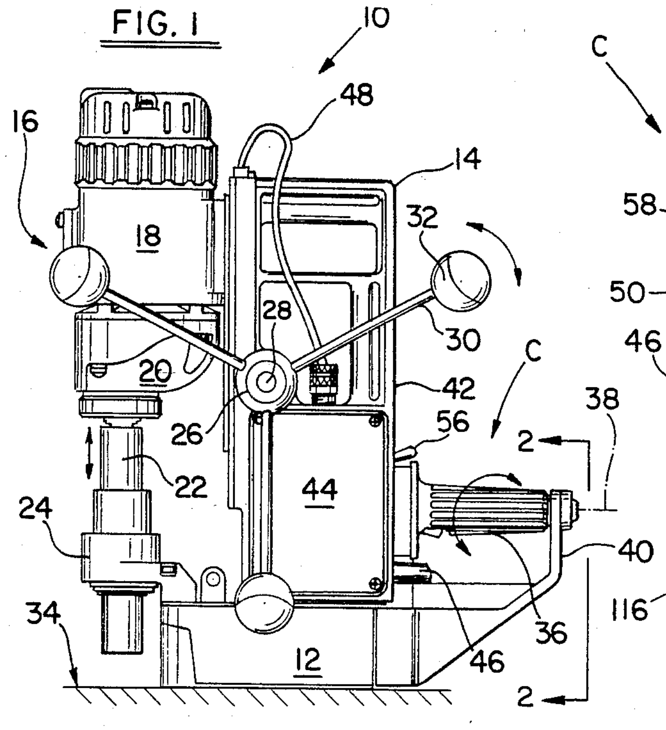
FIG. 1 is a side elevational view of a magnetic base drilling machine in accordance with the present invention.

FIG. **7*a*** is a detail view of a pointed stabilizer pin retracted above a work surface;

FIG. **7*b* is a detail view of the stabilizer pin of FIG. 7*a*** engaging the work surface so as to lift a base portion of the drilling machine above the work surface;

FIG. **7*c* is a detail view of the stabilizer pin of FIG. 7*a* with its point penetrating the work surface; and FIG. 8 is a schematic electrical diagram of the circuitry of the drilling machine of FIG. 1**.

DESCRIPTION OF THE PREFERRED EMBODIMENT

A magnetic base machine tool in accordance with the present invention is illustrated in FIG. 1 and takes the form of a drilling or boring machine designated generally therein by the reference character 10. As shown, the drilling machine 10 includes a base 12 that contains a magnet coil and flux concentrating core (not shown), a frame 14 extending upwardly from the base, a motor assembly 16 mounted on the frame for guided movement along a generally vertical tool axis, and a controller C for operating the drilling machine. The motor assembly 16 includes an electric motor 18 coupled to a gear head 20 which, in turn, is coupled to and drives an output element 22 that is rotatably carried in a guide bushing assembly 24. The motor assembly 16 is mounted in guideways (not shown) formed in the frame 14 for generally bidirectional vertical movement. A hub 26 is mounted on a shaft 28 that is connected to a pinion gear (not shown) which, in turn, engages a rack (not shown) connected to the motor drive assembly 16. Radially aligned shafts 30 extend from the hub 26 and terminate in knobs 32 so that rotation of the hub 26 and the connected pinion causes the motor assembly 16 to move in a guided manner to and from a work surface indicated generally at 34.

As shown in FIGS. 1, 2, and 3, the controller C includes a control handle 36, preferably formed from a foamed plastic, that is mounted for controlled rotation about an axis 38 and is supported between the frame 14 and an outwardly extending bracket 40 that extends from a rear wall 42 of the frame 14. A cover plate 44 covers an electrical component compartment formed in the frame 14 in which various switches and related electrical circuit components, described more fully below, are provided. An electrical power cable 46 provides power to the electrical component compartment and another cable 48 connects the motor assembly 16 with the electrical circuitry contained within the electrical component compartment. As shown in FIGS. 2, 3, and 4, the controller C includes a multi-function control cam 50 carried with the control handle 36 for rotation about the axis 38. A motor power ON/OFF switch 52 is mounted on a switch panel 54 above the control cam 50 and includes a manually operable handle 56. The control cam 50 includes a peripheral surface 58 that includes a slot like cut-out 60 designed to accommodate the handle 56 of the motor power switch 52. The handle 56 can be moved from a upper OFF position shown in FIGS. 2 and 3 to a lower ON position when the control cam 50 is positioned so that the cut-out 60 is located directly below the handle 56. When the control cam 50 is rotated so that the cut-out 60 is out of registration with the handle 56 of the switch 52, the handle 56 is blocked from downward movement by the peripheral surface 58 and cannot be moved to its lower ON position.

As shown in the side elevational view of FIG. 3, the control handle 36 is rotatably mounted on the shank portion of a threaded bolt 62 that extends, on the one end, through a bushing 64 mounted in the support bracket 40 and, on the other end, through a similar bushing 66 mounted in the rear wall 42 of the frame 14 with a washer 68 and threaded nut 70 maintaining the components in an assembled relationship. The control handle 36 includes a generally cylindrical gripping surface, which is preferably fluted to facilitate manual gripping, and an outwardly enlarged portion 72 adjacent the rear wall 42 which receives the control cam 50. As shown in FIG. 4, the control cam 50 includes axially extending projections 74 and 76 which are received within appropriate cavities (not shown) formed in the outwardly enlarged portion 72 of the control handle 36 so that the control cam and handle are coupled to one another.

The control cam 50, as shown in FIG. 4, includes a lug 78 upon which a detent assembly 80 is mounted. As shown in FIG. 3, the detent assembly 80 includes a trigger 82 pivotally mounted to the lug 78 by a pin 84 with a coil spring 86, in compression, positioned between the lug 78 and the trigger 82 to urge the trigger 82 to its initial position as shown in FIG. 3. The trigger 82 includes an extension 88 that is connected to a detent pin 90 slidably carried in a bore 92 (FIG. 4) formed in the control cam 50. As shown in FIG. 3, a detent cavity 94 is provided in the rear wall 42 of the frame 14 to receive the remote end of the detent pin 90 to lock the control handle 36 and control cam 50 from rotation. The trigger 82 can be actuated against the force of the spring 86 to withdraw the detent pin 90 from its cavity 94 to free the control handle 36 and control cam 50 for rotation about the axis 38.

As shown in FIGS. 2 and 3, a stabilizer assembly, generally designated by the reference character 96, is mounted below the control cam 50 adjacent the rear wall 42. The stabilizer assembly 96 includes a stabilizer pin 98 having a sharply pointed lower end 100 mounted in a guideway 102 for limited movement in the vertical direction and a cam follower-rod 104 similarly mounted in a guideway 106 for limited movement in the vertical direction. The cam follower-rod 104, at its upper end, engages a circumferential cam surface of the control cam 50, described more fully below, and, at its lower end, is in threaded engagement with the stabilizer pin 98 with a lock nut 108 and washer 110 permitting adjustment between the cam follower-rod 104 and the stabilizer pin 98. Flat surfaces 112 can be provided on opposite sides of the cam follower rod 104 and similar flat surfaces 114 (FIG. 2) can be provided on opposite sides of the stabilizer pin 98 to permit convenient relative adjustment of the two components. A coil spring 116, in compression, is provided between the stabilizer pin guideway 102 and the washer 110 to resiliently urge the stabilizer pin 98 and connected cam follower-rod 104 upwardly in FIG. 3.

As shown in FIG. 4, the control cam 50 includes a peripheral cam surface 118 defined between a first shoulder 120 and a second shoulder 122. The distance of the cam surface 118 from the center line of the control cam 50 varies from a minimum at the shoulder 120 to a maximum at the shoulder 122 to provide an outwardly rising profile between the shoulder 120 and the shoulder 122 and, conversely, a declining profile between the shoulder 122 and the shoulder 120. The peripheral cam surface 118, as shown in FIG. 3 and as discussed more fully below, is in sliding engagement with the upper end of the cam follower-rod 104 that controls the stabilizer pin 98. Rotation of the control handle 36 and the control cam 50 will cause the peripheral cam surface 118 to urge the cam follower-rod 104 and its connected stabilizer pin 98 downwardly in FIG. 3 or allow the spring 116 to urge the stabilizer pin 98 upwardly, depending upon the direction of rotation of the control handle 36.

The control cam 50 also includes axial-face cams 124 and 126 on the side of the control cam 50 opposite that shown in FIG. 4 with the outline of these two cam shown in broken-line illustration. As shown in the partial edge views of FIGS. 4*a* and 4*b*, the axial-face cam 124 includes a central dwell surface 128 with oppositely rising profiles 132 and 134 on either side, and the axial-face cam 126 includes lower and upper dwell surfaces 136 and 138 joined by an intermediate rising surface 140. As explained in more detail below, the axial-face cams 124 and 126 function to control electrical switches that apply and interrupt electrical current to the drilling machine circuitry and which reverse the flow of the applied current to the magnet coil in the base 12.

The three principal operating positions of the controller C are represented in FIGS. 5*a*, 5*b*, and 5*c* with FIG. 5*a* representing a 'initial' or pre-start position, FIG. 5*b* representing an 'operate' position, and FIG. 5*c* representing a 'demagnetization' position. Electrical power switches, described in more detail below in relationship to FIG. 8, are mounted in the rear wall 42 of the frame 14 and have projecting actuator buttons that engage the surfaces of the axial-face cams 124 and 126. As shown in FIG. 5*a*, a main power ON/OFF switch 142 (broken-line illustration) is mounted for engagement with the axial-face cam 124 and a magnetization/demagnetization (MAG/DEMAG) switch 144 is mounted for engagement with the axial-face cam 126.

FIGS. 6*a*, 6*b*, and 6*c* are idealized representations of the respective switch actuator buttons relative to their controlling axial-face cam surfaces. As shown in these FIGS., an actuator button 146 for the ON/OFF power switch 142 engages and is controlled by the axial-face cam 124, and an actuator button 148 for the MAG/DEMAG switch 144 engages and is controlled by the axial-face cam 126.

As shown in FIG. 5*a*, the controller C, in its initial position is aligned so that the cam follower-rod 104 is at the approximate mid-position on the cam surface 118 between the shoulders 120 and 122. In this position the handle 56 of the motor power ON/OFF switch 52 is positioned above a peripheral portion 58 of the controller cam 50 and physically blocked from downward movement to its ON position, the motor switch 52 being thus 'blocked' in its OFF position. As shown, the cut-out 60 is located to the right of the switch handle 56. As shown in the related diagram of FIG. 6*a*, the actuator button 146 of the power ON/OFF switch 142 is positioned on the lower dwell portion 128 of the axial-face cam 124 with the switch 142 in its OFF state, and the actuator button 148 of the MAG/DEMAG switch 144 is positioned on the lower dwell surface 136 of the axial-face cam 126 in its MAG position, that is, the position in which the electrical current applied to the magnet coil in the drilling machine base 12 causes a magnetic field that draws the base 12 to the work surface 34.

In order to operate the controller C, the handle 36 is manually grasped, the trigger 82 is pulled to disengage the detent pin 90 and the handle 36 is rotated counterclockwise in FIG. *5a* to the position of FIG. *5b*. As the handle 36 is rotated, the peripheral cam surface 118 drives the stabilizer pin 98 downwardly toward and into contact with the work surface 34. Depending upon the hardness of the work surface 34 and as shown in FIG. *7b*, the point 100 usually will not immediately penetrate the work surface 34. The reaction force, however, can be sufficient to lift the base 12 above the work surface 34 by several thousandths of an inch, as schematically illustrated in FIG. *7b*. As the control handle 36 is rotated from the position shown in FIG. *5a* to that of FIG. *5b* and as shown in FIG. *6b*, the actuator button 146 is depressed by the inclining cam surface 134 to actuate the power switch 142 ON to apply electrical power the drilling machine 10 and the magnetic coil 212 (FIG. 8). The actuator button 148 of the MAG/DEMAG switch 144 remains on the dwell surface 136 in its initial MAG position. When the electrical power is applied to the drilling machine 10 by actuation of the ON/OFF switch 142, an electrical current is applied through the magnet coil in the base 12 to create a substantial and forcible attraction between the two, this force is sufficient to draw the point 100 of the stabilizing pin 98 into the work surface 34 as shown in FIG. *7c* to thus magnetically and mechanically connect the base 12 with the work surface 34. While not specifically shown in FIG. *5b*, the detent pin 90 (FIG. 3) engages a second detent cavity (not shown) to lock the control handle 36 in the position of FIG. *5b*.

When the control handle 36 is positioned as shown in FIG. *5b*, the cut-out 60 is located directly below the handle 56 of the motor ON/OFF switch 52 and is thus 'unblocked' to allow the operator to turn the motor 18 ON and OFF as desired. When the handle 56 of the motor ON/OFF switch 52 is in its lower ON position within the cut-out 60, the control handle 36 is blocked from rotation to prevent de-energization of the magent coil while the motor ON/OFF switch 52 is in its ON position. In order to de-energize the magnet coil in the base 12 and withdraw the stabilizer pin 98, the motor ON/OFF switch 52 must be turned OFF by moving its handle 56 out of the cut-out 60 to its initial upper position and the trigger 80 pulled to withdraw the detent pin 90 from its second detent position. The handle 36 is then rotated from the position of FIG. *5b* to that of FIG. *5a* causing the spring 116 to withdrawn the stabilizer pin 98 from the work surface 34 and the ON/OFF power switch 142 to interrupt power to the magnet coil in the base 12. The time duration of these operations from the time the motor ON/OFF switch 52 is moved to its OFF position until the ON/OFF power switch 142 interrupts power to the magnet coil is such that the motor 18 will have had an opportunity to run down to a halt or near halt thereby greatly dissipating any inertia in the motor 18. Accordingly, the motor 18 cannot be operated unless the magnet coil is energized.

Where the magnet coil has been energized for a substantial period of time, a permanent magnetic set can be induced into the work surface 34 making removal of the base 12 difficult. In this situation, a reverse demagnetizing field can be established by rotating the control handle 36 to the position of FIG. *5c*. As the control handle 36 is rotated and as shown in FIG. *6c*, the actuator button 148 of the MAG/DEMAG switch 144 is first actuated by the transition from the cam surface 136 to the cam surface 138 to cause the switch 144 to switch from its MAG position to its DEMAG position to reverse its polarity. Thereafter, the actuator button 146 of the main power ON/OFF switch 142 is actuated by the rising cam surface 132 to re-apply power to the magnet coil, which generates a reversed magnetic field that allows convenient removal of the base 12.

The following table summarizes the positions of selected parts in the positions of FIGS. *5a*, *5b*, and *5c*.

TABLE

| COMPONENT | FIG. 5a | FIG. 5b | FIG. 5c |
|---|---|---|---|
| DETENT PIN 90 | ENGAGED AT 1st POS. | ENGAGED AT 2nd POS. | NOT ENGAGED |
| STABILIZER PIN 98 | RETRACTED | EXTENDED | RETRACTED |
| PWR SW 142 | OFF | ON | ON |
| SWITCH 144 | MAG | MAG | DEMAG |
| MTR SW 52 | BLOCKED | UNBLOCKED | BLOCKED |

The electrical circuit for the drilling machine 10 is shown is FIG. 8 and designated generally therein by the reference character 200. The main power ON/OFF switch 142 is defined by double-pole single-throw (DPST) contacts 202 connected to a source of power and operable to provide electrical power to opposite input sides of a full-wave diode bridge 204 with a varistor 206 provided in the diode bridge input circuit to control the current flow. The rectified output of the diode bridge 204 is provided through a resistor 208 to the MAG/DEMAG switch 144 defined by double-pole double-throw (DPDT) polarity reversing contacts 210 which are connected to the magnet coil 212. Operation of the MAG/DEMAG switch 144 by the axial-face cam surface 126 selectively reverses the flow of current to the magnet coil 212 to reverse the direction of the generated magnetic field. The motor ON/OFF switch 52 includes DPST contacts 214 with one contact set that closes the motor 18 circuit across the diode bridge 204 to selectively energize the motor 18 and another contact set that places a capacitor 216 across the magnet coil 212 at the poles of the MAG/DEMAG switch 144. An indicator lamp 216 is connected across the output of the diode bridge 204 to indicate the power ON/OFF states.

Thus it will be appreciated from the above that as a result of the present invention, a highly effective magnetic base machine tool is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A power tool comprising:

an electromagnetic base through which an electrical current can be passed for generating a magentic field:

an electric motor connected to said electromagnetic base for driving a tool;

electrical circuit means in circuit with said electromagnetic base and said electric motor for providing electric current thereto, said circuit means having first actuatable switching means for providing electric current to said electromagnetic base for effecting magnetic engagement with a work surface and having second switching means operable between an ON position for providing electric current to said motor and an OFF position; and cam means for controlling operation of said first and said second switching means, said cam means having a first cam surface means coupled to said first switching means for actuating said first switching means to supply an electric current to said electromagnetic base and having second surface means for permitting operation of said second switching means to its ON position when said first switching means is actuated to supply electric current to said electromagnetic base and for preventing operation of said second switching means to its ON position when said first switching means is not actuated to supply electric current to said electromagnetic base.

2. The power tool of claim 1, wherein said cam means further permits actuation of said first switching means to interrupt the electric current to said electromagnetic base only when said second switching means in its OFF position.

3. The power tool of claim 1, wherein said second surface means comprises:

a switch blocking surface for blocking operation of said second switching means when said first switching means is not actuated by said first cam surface to provide electric current to said electromagnetic base.

4. The power tool of claim 3, wherein:

said second switching means includes a handle moveable between first and second positions, said switch blocking surface of said cam means precluding movement of said handle to said second position unless said first switching means is operated to supply electric current to said electromagnetic base.

5. The power tool of claim 4, wherein:

said switch blocking surface of said cam means includes a cut-out portion thereof for receiving said handle of said second switching means when said first switching means is operated to supply electric current to said electromagnetic base.

6. The power tool of claim 1, wherein said first switching means comprises:

a first ON/OFF switch for applying electric power to said electromagnetic base in response to operation of said cam means and a second reversing switch in circuit with said first ON/OFF switch for reversing the electric current to said electromagnetic base between first and second directions in response to operation of said cam means.

7. The power tool of claim 6, wherein said first cam surface engages said first ON/OFF switch, and wherein said cam means further comprises a second cam surface for engaging said second reversing switch, said cam means operable to a first position in which said first ON/OFF switch and said second reversing switch apply electric current to said electromagnetic base in a first direction and said cam means operable to a second position in which said first and second cam surfaces operate said first ON/OFF switch and said second reversing switch to apply electric current to said electromagnetic base in a second direction.

8. The power tool of claim 6, wherein said cam means comprises:

a cam member mounted for rotation about an axis, said cam member having first and second axial-face cams for engaging, respectively, said first ON/-OFF switch and said second reversing switch means, said cam member having a radially extending flange defining a switch blocking surface, said switch blocking surface blocking operation of said second switching means when said first ON/OFF switch is in its OFF position and allowing operation of said second switching means when said first ON/OFF switch is in its ON position.

9. The power tool of claim 8, wherein said second switching means includes a handle moveable between first and second positions and said switch blocking surface includes a cut-out portion, said handle of said second switching means, when in its ON position, being received within said cut-out and preventing movement of said cam member.

10. The power tool of claim 1, further comprising:

stabilizing pin means coupled to said cam means and operable to engage a work surface in response to operation of said cam means to cause said first switching means to supply electric current to said electromagnetic base.

11. The power tool of claim 10, further comprising:

a peripheral surface cam engaging said stabilizing pin means for driving a stabilizing pin into a work surface in response to operation of said cam means to cause said first switching means to supply electric current to said electromagnetic base.

* * * * *